United States Patent [19]

Hehl

[11] 3,822,975

[45] July 9, 1974

[54] INJECTION UNIT FOR AN INJECTION MOLDING MACHINE

[76] Inventor: Karl Hehl, Seidling 187, D-7291, Lossburg, Wurttemberg, 48195

[22] Filed: Feb. 29, 1972

[21] Appl. No.: 230,350

[30] Foreign Application Priority Data
Mar. 12, 1971 Germany............................ 2111978

[52] U.S. Cl............................. 425/107, 425/242 R
[51] Int. Cl.............................................. B29f 1/03
[58] Field of Search........... 425/450, 245, 449, 242, 425/247, 107; 164/306, 312, 313, 314, 317; 198/213

[56] References Cited
UNITED STATES PATENTS

| | | | |
|---|---|---|---|
| 2,804,649 | 9/1957 | Hupfield............................ | 425/245 X |
| 2,916,769 | 12/1959 | Baigent............................ | 425/247 X |
| 3,015,849 | 1/1962 | Mittelstadt...................... | 164/314 X |
| 3,270,383 | 9/1966 | Hall................................ | 164/314 X |
| 3,337,921 | 8/1967 | Kaiser............................ | 425/247 X |
| 3,395,424 | 8/1968 | Novel................................ | 425/245 |
| 3,406,429 | 10/1968 | Draudt............................ | 425/188 X |
| 3,509,601 | 5/1970 | Johansson...................... | 425/245 X |
| 3,588,957 | 6/1971 | Schwartz........................ | 425/242 X |
| 3,609,817 | 10/1971 | Deerburg........................ | 425/242 X |

Primary Examiner—J. Spencer Overholser
Assistant Examiner—John S. Brown
Attorney, Agent, or Firm—Spencer & Kaye

[57] ABSTRACT

An injection unit for an injection molding machine including a cylindrical carrier member within which a hollow piston is mounted. The hollow piston has mounted therein a second piston which is connected to a conveying worm of the injection unit plasticizing cylinder. The cylindrical carrier and the hollow piston are operatively associated to form a first hydraulic system for the axial movement of the injection unit. The hollow piston and the second piston are operatively associated to form a second hydraulic system for injecting the synthetic material into the mold.

12 Claims, 6 Drawing Figures

3,822,975

INJECTION UNIT FOR AN INJECTION MOLDING MACHINE

BACKGROUND OF THE INVENTION

The present invention relates to injection molding machines, and more particularly to an injection unit for an injection molding machine having a plasticizing cylinder within which a rotatable conveying worm is displaceable and at least two hydraulic drive systems supported by an injection unit carrier. At least one drive system serves to inject the plasticized synthetic material into the mold and at least one further drive system serves to axially move the injection unit into and out of its injection position.

In known injection units of the type referred to above, the injection unit carrier is formed by struts on which a bridge for the plasticizing cylinder and a bridge for the conveying worm are axially displaceably mounted. Such an injection unit is disclosed, for example, in applicant's own U.S. Pat. No. 3,349,439.

SUMMARY OF THE INVENTION

It is a general object of the present invention to provide an injection unit of the type under consideration, and particularly one which is fastened to a mold clamping unit at a frontal surface only so that the remaining portion thereof is otherwise freely suspended, with the injection unit being compactly constructed so that with an axial application of force, the injection unit can be statically supported, that is, substantially without any transverse oscillations or vibrations, by the mold clamping unit, even though the weight of the injection unit is relatively high.

It is a more specific object of the present invention to provide an injection unit for an injection molding machine in which an injection unit carrier member in the form of a cylinder is fastened to a mold clamping unit.

It is a related specific object of the present invention to provide an injection unit for an injection molding machine in which the cylindrical carrier member surrounds a hollow piston and forms therewith a first hydraulic drive system.

It is another related specific object of the present invention to provide an injection unit for an injection molding machine in which the hollow piston surrounds a second piston and forms therewith a second hydraulic drive system.

It is yet another related object of the present invention to provide an injection unit for an injection molding machine which the hollow piston surrounds an insert assembly which in turn surrounds another piston, with the insert assembly and the other piston forming a third hydraulic drive system.

These and other objects are accomplished according to the present invention by the provision of a cylinder as the carrier member within which a hollow piston bearing a plasticizing cylinder is mounted, with the cylinder and hollow piston operatively associated to form a first hydraulic drive system for the axial movement of the injection unit; and by the provision of a second piston which is surrounded by the hollow piston and is coaxially connected with a conveying worm of the injection unit, with the hollow piston and the second piston operatively associated to form a second hydraulic drive system for the injection of the synthetic material into the mold.

Advisably, the cylindrical carrier is provided at its front end with means for the direct fastening of the injection unit, for example, to the cylinder carrying assembly of the mold clamping unit.

According to a further embodiment of the present invention, the hollow piston is formed by a tubular member, two annular portions extending radially beyond the outer surface of the tubular member, and a seal, with the annular portions serving as a mount for the seal.

An injection unit of the type proposed in the present invention is extraordinarily well suited, for example, for the freestanding attachment to a mold clamping unit and specifically to the pressure cylinders of the mold closing unit thereof.

DESCRIPTION OF THE PREFERRED EMBODIMENTS

Figure 1:
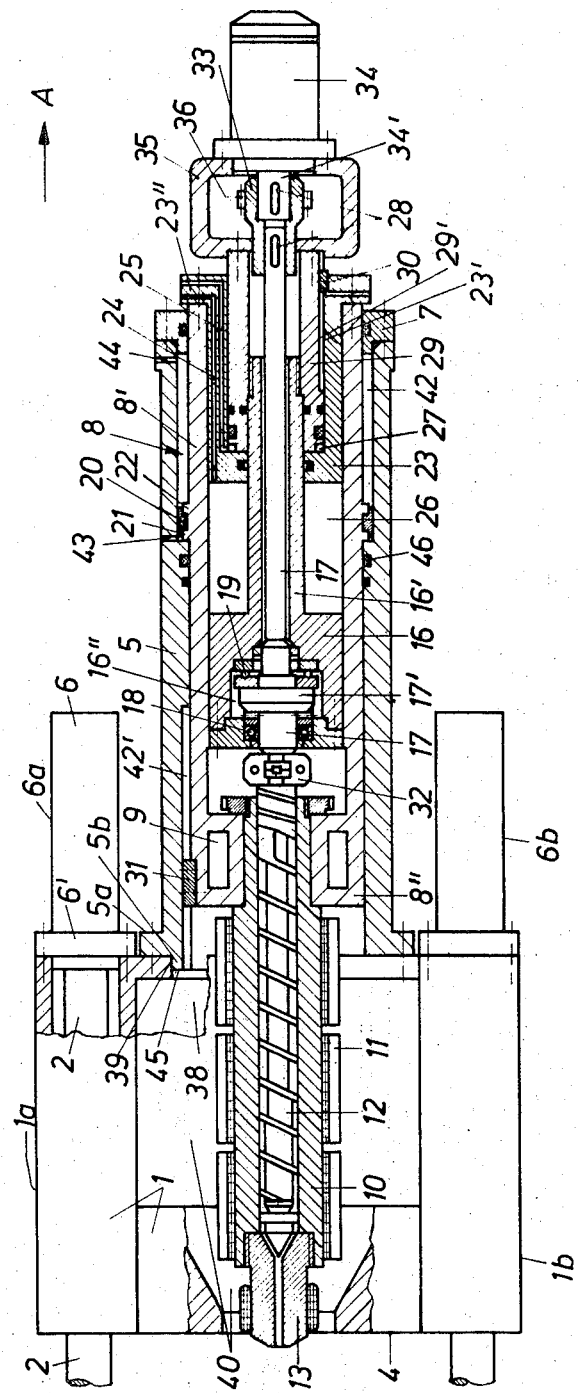
FIG. 1 is a plan view partially in cross section of the injection unit according to the present invention connected to a cylinder carrying mold assembly of a mold clamping unit.
Figure 2:
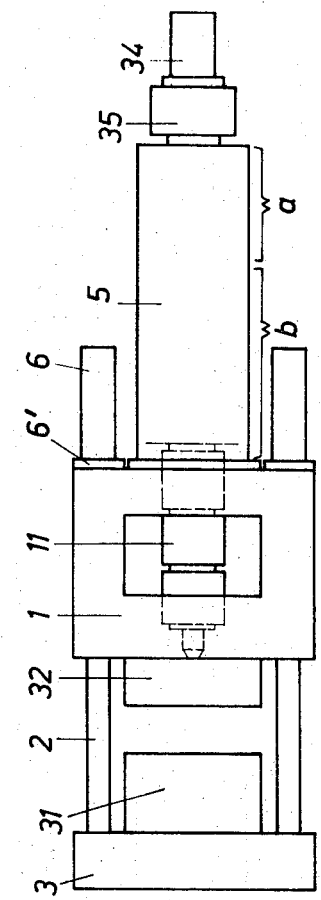
FIG. 2 is a schematic representation of the injection unit according to FIG. 1, to a smaller scale.
Figure 5:
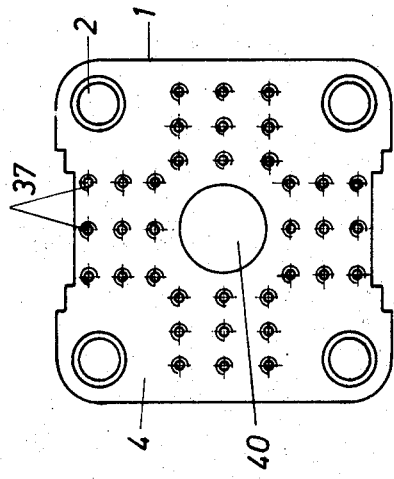
FIGS. 5 and 6 illustrate an alternate embodiment of the cylinder carrying mold assembly illustrated in FIGS. 3 and 4, respectively.
Figure 6:
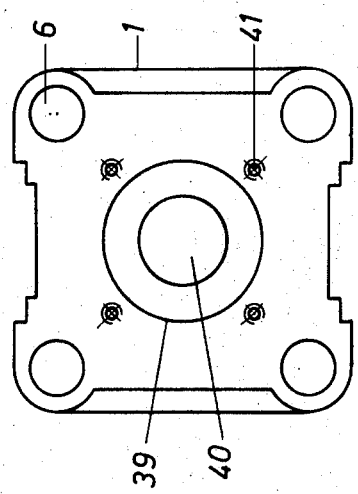

Referring now to the drawings, particularly FIGS. 1 and 2, there is provided a hollow cylinder 5 which is the sole carrier of an injection unit when the cylinder is in engagement with a mold clamping unit. The cylinder 5 is provided with a flange 5a which extends radially outwardly from the longitudinal surface of the cylinder and slightly inwardly towards a frontal side 45 thereof. Between the frontal side 45 and the flange 5a the wall of the cylinder 5 defines an annular shoulder 5b which serves as a centering member for the injection unit. The annular shoulder 5b cooperates with a cylindrical centering surface 39 of a cylinder carrying mold assembly 1 of the clamping unit. The mold assembly 1 forms a plurality of hydraulic pressure cylinders 1a, 1b (FIGS. 1–4), or 1a–1d (FIGS. 5 and 6). For purposes of the following description, the embodiment of the invention illustrated in FIGS. 1–4 will be referred to. It should, however, be understood that a similar application of the embodiment of the invention illustrated in FIGS. 4 and 5 is intended. The pressure cylinders are understood to means those hydraulic drive cylinders which build up the closing pressure for the mold halves 31 and 32. As can be seen in FIG. 2, the mold half 32 is supported at the frontal side of the cylinder carrying mold assembly 1 and is accordingly designated the stationary mold half. The mold half 31 is supported by a mold carrier 3 which in turn is supported by the piston rods 2 which extend outwardly from the pressure cylinders 1a, 1b. Accordingly, the mold half 31 is designated the movable mold half.

The cylindrical centering surface 39 forms an entrance of a passage channel 40 in the cylinder carrying mold assembly 1, through which a plasticizing cylinder assembly passes. The plasticizing cylinder assembly includes a plasticizing cylinder 10, a plurality of heating sleeves 11 and a nozzle 13. In FIG. 1, the injection unit is shown connected to the rearward frontal face of the cylinder carrying mold assembly 1 with the aid of the flange 5a. That is, the injection unit is mounted within the cylinder 5 which in turn is connected to the assembly 1. It would, however, also be conceivable for the cylinder 5 to be fastened to the cylinder carrying mold assembly 1 in some other way, e.g. the cylinder 5 could be connected to the hydraulic drive cylinders 6a and 6b, which are coaxially connected to the pressure cylinders 1a, 1b and which serve to open and if so desired also to close the mold. If the injection unit operates to inject material longitudinally of the parting line of the mold halves 31, 32, the cylinder 5 may, for example, be centered by an annular centering member of a carriage (not shown) which is mounted in guides (also not shown) on one longitudinal side of the cylinder carrying mold assembly.

The cylinder 5 together with a hollow piston 8, which supports the plasticizing cylinder 10 with its heating sleeves 11 and nozzle 13, forms a first hydraulic drive system. The first hydraulic drive system serves for the axial movement of the injection unit.

The hollow piston 8 is formed as a tubular member 8' which surrounds a second piston 16. The piston 16 is coaxially connected with the conveying worm 12 in a manner to be described hereinafter. The piston 16 together with the tubular member 8' form a second hydraulic drive system. This second system serves to inject a synthetic material into the mold. The hollow piston 8 further includes two annular portions 21, 22 which extend radially outwardly from the outer surface of the tubular member. The annular portions 21, 22 serve to hold a seal member 20. The annular portions and the seal define an assembly which can be charged with pressurized oil.

The cylinder 5 is provided with a stepped inner bore which defines two regions a and b. The region a has a greater innner diameter than the region b. In the region a, the inner surface of the cylinder 5 and the outer surface of the tubular member 8' define a cylindrical chamber 42 of the first hydraulic drive system. The hollow piston 8 is guided within the cylinder 5 as a result of the engagement of the outer surface of the piston 8 and the inner surface of the cylinder 5 in the region b as well as by the engagement of the outer surface of the piston 8 and the inner surface of a sealing ring 7. The sealing ring 7 is provided at the free end of the piston 8 and connected to the rear end surface of the cylinder 5. The sliding surfaces are automatically lubricated when these surfaces slide relative to each other by the pressurized oil entering the chamber 42 through the oil port 43. An annular seal 46 inserted within a groove in the cylinder 5 forms a type of seal with the outer surface of the piston 8 which permits passage of small quantities of the pressurized oil.

The tubular member 8' supports at its front end in a bore 8' provided therein the plasticizing cylinder 10 of the injection unit in a press fit manner. Within the piston 8 surrounding the region of contact between the piston 8 and the cylinder 10, a cooling channel 9 is provided. The tubular member 8' is closed at its rear end by a cup-shaped molded insert 23. The molded insert 23 accommodates within a central bore 23' thereof a piston 29 which is indirectly connected to the conveying worm 12. The insert 23 and the piston 29 form a third hydraulic system (relaxation system).

The hollow piston 8 is secured against rotation by means of a wedge 30 which engages in a longitudinal groove 42' at the forward end of the cylinder 5. In a like manner, the piston 29 is secured against rotation with the aid of a wedge 30. The wedge 30 engages in a longitudinal groove 29' of the piston 29.

A rotational drive 34 with a drive housing 35 is fastened to the rear of the piston 29. The torque of the rotational drive 34 is transmitted via a driven shaft 34', a coupling 33, a transmission shaft 17 having a follower flange 17', and a clutch 32 to the conveying worm 12. A pair of follower wedges 28 couple the driven shaft 34' of the rotational drive 34 firmly to the transmission shaft 17 via the coupling 33. The hollow piston 29 of the relaxation system is connected with the piston 16 via a hollow piston rod 16' to form a unitary moving assembly. A radial bearing 18 serves to mount the transmission shaft 17 to the piston 16.

The flange 17' is situated within a central annular bore 16''. Between the flange 17' and the base of the bore 16'' an axial bearing 19 is mounted on the shaft 17. During the injection stroke of the injection unit the thrust of the piston 16 is transmitted via the axial bearing 19 to the flange 17' and consequently to the conveying worm 12.

Figure 3:
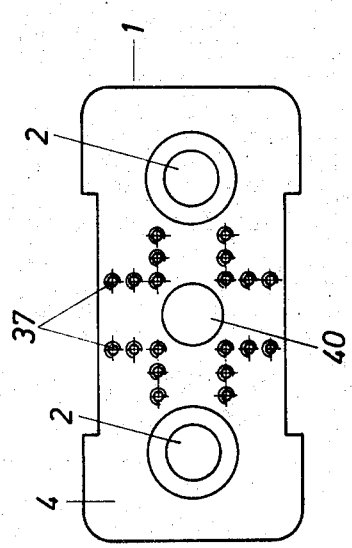
FIG. 3 is a front view in elevation of the cylinder carrying mold assembly bearing the injection unit.
Figure 4:
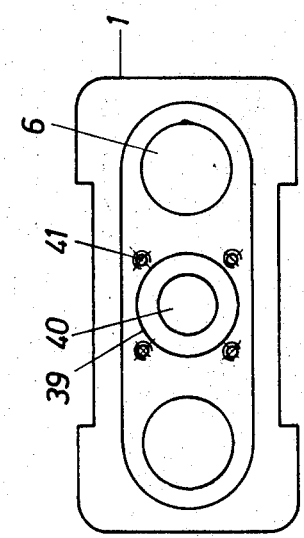
FIG. 4 is a rear view in elevation of the cylinder carrying mold assembly bearing the injection unit.

As can be seen in FIGS. 3 and 5, the frontal side 4 of the cylinder carrying mold assembly 1 is provided with a plurality of fastening holes 37 for fastening with appropriate means (not shown) the stationary mold half 32. In FIGS. 4 and 6 the rear side of the cylinder carrying mold assembly is shown with each side provided with a plurality of fastening holes 41, for fastening with appropriate means (not shown) the flange 5b of the cylinder 5 bearing the injection unit.

The injection unit operates as follows:

The injection unit according to FIG. 1 is shown at the moment in the injection processing cycle where an injection has just been completed. After completion of the injection the rotational drive 34 of the conveying worm is switched on and a quantity of material then accumulates in front of the conveying worm 12. As a result of the accumulated material an accumulation pressure is developed which causes the conveying worm 12 to retract away from the mold. Thereafter, the drive 34 of the conveying worm is stopped. If a sufficient quantity of plasticized material has accumulated, a cylindrical chamber 27 of the relaxation system is charged with pressurized oil via an inlet port 25.

In this connection the extracting movement of the conveying worm operates a switch at the end of the movement, which controls a valve of the hydraulic system.

With a slight rearward stroke of the piston 29, the accumulation pressure in the plastic material in front of the conveying worm is relieved, i.e. this material relaxes. This is so because the conveying worm 12 is moved with the piston 29. Along with the piston 29, the piston rod 16', the piston 16, the shaft 17, the worm 12, the housing 35 and the drive 34 are moved axially in the direction of arrow A in FIG. 1. The piston 29 generally performs a stroke of short length, i.e. of about 1 to 15 mm, so that the conveying worm 12 is pulled back by that amount.

As a result of the relaxation of the accumulated material subsequent removal of the plasticizing cylinder from the mold prevents the escape of the plastic material from the contiuously open nozzle 13. In order to remove the plasticizing cylinder 10, the front cylinder chamber 42 is charged with pressurized oil through the inlet port 43. The removal of the plasticizing cylinder interrupts the thermal contact between the nozzle 13 and the mold.

In order to move the injection unit toward the mold, the cylinder chamber 42 is charged through the port 44 with a pressurized oil. After the plasticizing cylinder is moved into place, the synthetic material is injected through the nozzle 13 into the mold as a result of the cylinder chamber 26 being charged with a pressurized medium through the port 24, so that the conveying worm 12 reaches the position according to FIG. 1 in the course of an axial stroke of the piston 16.

The injection unit according to the present invention is suited for processing, for example, thermoplastics, duroplastics and elastomers.

It will be understood that the above description of the present application is susceptible to various modifications, changes and adaptations, and the same are intended to be comprehended within the meaning and range of equivalents of the appended claims.

I claim:

1. An injection unit forming part of an injection molding machine that also includes a mold clamping unit for supporting a mold; the injection unit being of the type that has a first hydraulic drive system for injecting a plasticized synthetic material into the mold and a second hydraulic drive system for axially moving the injection unit with respect to the mold clamping unit; comprising in combination:
   a. an injection unit support cylinder affixed at one of its ends to said mold clamping unit in a centered relationship therewith;
   b. a first, hollow piston coaxially received in said support cylinder and arranged for axial sliding motion with respect to said support cylinder to form therewith said second hydraulic drive system;
   c. a plasticizing cylinder affixed to said first piston in axial alignment therewith for being carried thereby;
   d. a second piston coaxially received in said first piston and arranged for axial sliding motion with respect to said first piston to form therewith said first hydraulic drive system;
   e. a conveyor worm coaxially received in said plasticizing cylinder and arranged for rotation and axial sliding motion with respect to said plasticizing cylinder; and
   f. means for coupling said conveyor worm to and in axial alignment with said second piston.

2. An injection unit as defined in claim 1, wherein said support cylinder is provided at said one end with a flange and an annular shoulder formed by said support cylinder between the flange and said one end of said support cylinder, said shoulder serving as a centering member of said support cylinder.

3. An injection unit as defined in claim 2, wherein the mold clamping unit further includes a cylinder carrying mold assembly which forms a plurality of pressure cylinders and includes a passage channel through which the plasticizing cylinder passes and a centering surface at one end thereof, and wherein said annular shoulder and the centering surface are in engagement when the injection unit is mounted to the mold clamping unit.

4. An injection unit as defined in claim 1, wherein said first, hollow piston is formed from a tubular member, two annular portions which extend radially outwardly from the outer surface of said tubular member, and a seal member, said seal member being held by said annular portions.

5. An injection unit as defined in claim 4, wherein said support cylinder is provided with a stepped inner bore having a first region defining a first inner diameter and a second region defining a second inner diameter, said second inner diameter being greater than said first inner diameter, said hollow piston and said second region defining a cylindrical chamber.

6. An injection unit as defined in claim 5, further comprising a sealing ring fastened to the back end of said support cylinder and defining an inner diameter, and wherein the outer surface of said tubular member is guided by the inner diameter of said first region and the inner diameter of said sealing ring.

7. An injection unit as defined in claim 6, wherein said first inner diameter includes an annular groove within which an annular seal is held for engagement with the outer surface of said tubular member, and wherein said cylinder is provided with means through which a pressure medium is applied to said cylindrical chamber with a portion of said pressure medium passing said annular seal thereby automatically lubricating the inner diameter of said first region and the outer surface of said tubular member.

8. An injection unit as defined in claim 7 wherein the tubular member is provided at its front end with a bore in which the plasticizing cylinder is engaged in a press fit manner, and a cooling channel.

9. An injection unit as defined in claim 4, further comprising connecting means, wherein said tubular member is provided at its rear end with a cup-shaped molded insert, said insert including a central bore within which a third piston and a piston rod are mounted, said insert, third piston and piston rod forming a third hydraulic system which serves to relax the pressure accumulation in the synthetic material prior to injection, said third piston being connected to said plasticizing cylinder by said connecting means.

10. An injection unit as defined in claim 9, further comprising a rotational drive for the conveying worm, said drive being fastened at one end of said third piston, wherein said connecting means includes a transmission shaft extending coaxially with the injection axis of the injection unit, said third piston being connected through said transmission shaft to said conveying worm.

11. An injection unit as defined in claim 10, further comprising means operatively associated with said third piston and said cup-shaped insert to prevent rotation of said third piston relative to said insert, and means operatively associated with said first piston and said support cylinder to prevent rotation of said first piston relative to said support cylinder.

12. An injection unit as defined in claim 9, wherein said third piston is connected with said second piston via said piston rod so that said third piston moves as a unit with said second piston.

* * * * *